Feb. 14, 1933.     G. A. BIGGS     1,897,834
HYDRAULIC TURBINE
Filed March 6, 1929     3 Sheets-Sheet 1

INVENTOR
George A. Biggs
BY Toulmin + Toulmin
ATTORNEY

Feb. 14, 1933.    G. A. BIGGS    1,897,834
HYDRAULIC TURBINE
Filed March 6, 1929    3 Sheets-Sheet 2
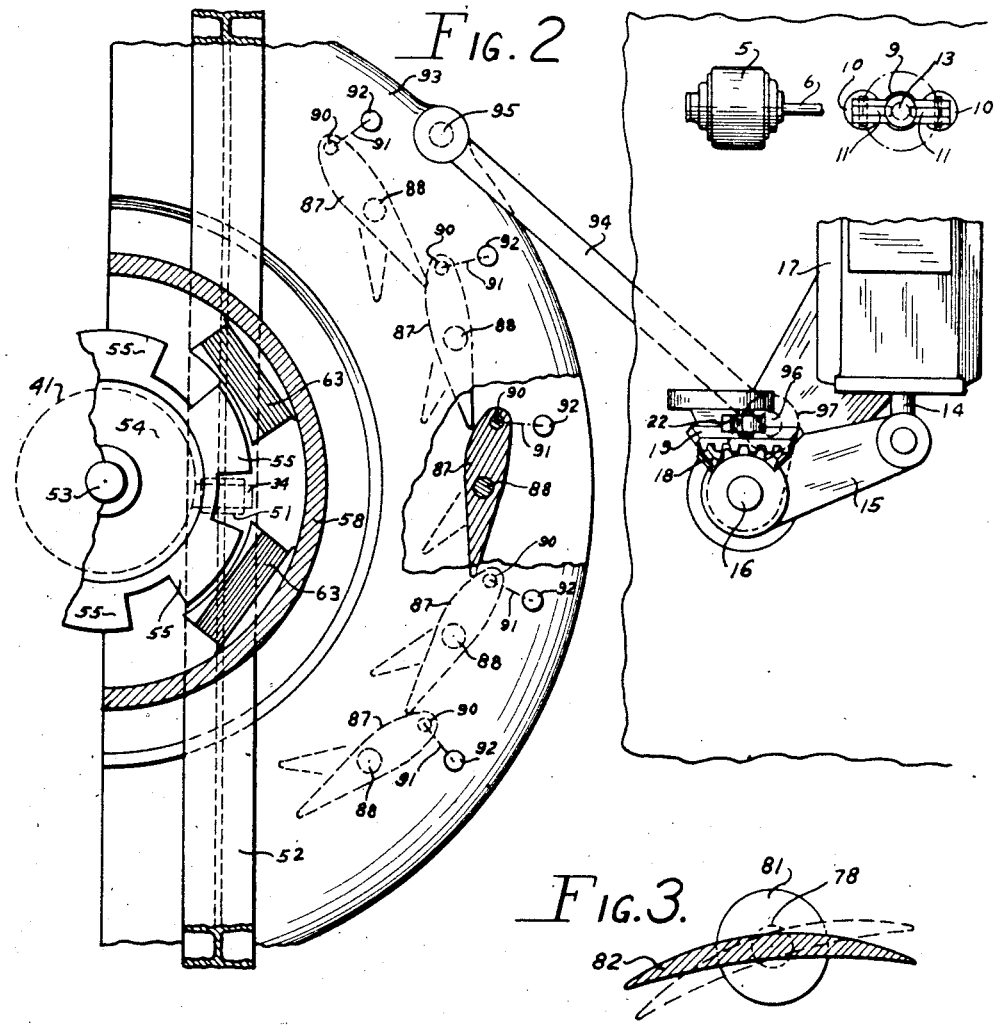
Fig. 2
Fig. 3
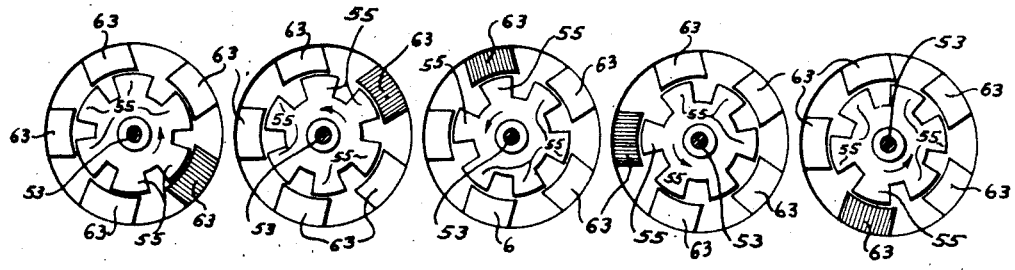
Fig. 4.   Fig. 5.   Fig. 6.   Fig. 7.   Fig. 8.
INVENTOR.
George A. Biggs
BY
Toulmin & Toulmin
ATTORNEY.

Feb. 14, 1933.  G. A. BIGGS  1,897,834
HYDRAULIC TURBINE
Filed March 6, 1929   3 Sheets-Sheet 3

INVENTOR
George A. Biggs
BY Toulmin + Toulmin
ATTORNEY

Patented Feb. 14, 1933

1,897,834

UNITED STATES PATENT OFFICE

GEORGE A. BIGGS, OF SPRINGFIELD, OHIO, ASSIGNOR TO THE JAMES LEFFEL & COMPANY, OF SPRINGFIELD, OHIO, A CORPORATION OF OHIO

HYDRAULIC TURBINE

Application filed March 6, 1929. Serial No. 344,717.

My invention relates to hydraulic turbines.

The object of my invention is to provide a runner having variable position runner buckets, the position of which is controlled by electro-mechanical means.

In particular, it is the object of my invention to effect such control depending upon the state and condition of the generator so that the speed of the generator can be maintained at a constant rate irrespective of the variations in water flow over the buckets of the runner.

It is my object to provide such control for adjusting the vanes of a turbine runner while it is in operation to prevent the shutdown of the runner for adjustment; and to adapt my invention to the use with direct, single or polyphase electric current.

It is a further object to provide such a control in synchronism with the adjustment of the gates and to adjust the gates synchronously with the turbine runner buckets in harmony with the condition of the generator.

It is a further object to provide adjustment of the runner buckets through the runner shaft without necessitating the use of the very expensive feature of a hollow generator shaft.

It is my object to provide a control in which electro-mechanical means for adjusting the vanes is attached to the turbine shaft to cause rotation of the secondary shaft inside the main turbine shaft for the purpose of transmitting electro-motive force to the vanes of the runner.

It is a further object to provide means of connecting the generator shaft and the runner shaft which will also serve as an enclosure and support for the electro-mechanical devices that adjust the runner bucket positions, such housing also being utilized as a fly-wheel, and forming a connection adaptable to existing generators without modification of them.

Referring to the drawings:

Figure 2 is a section on the line 2—2 of Figure 1;

Figure 3 is a section on the line 3—3 of Figure 1;

Figure 4 is a diagrammatic view showing the position of the solenoids in relation to the rotor of the electrical positioning mechanism for the runner brackets;

Figure 5 is a similar view showing the energization of the B solenoid;

Figure 6 is a similar view showing the energization of the C solenoid;

Figure 7 is a similar view showing the energization of the D solenoid;

Figure 8 is a similar view showing the energization of the E solenoid;

Figure 1:
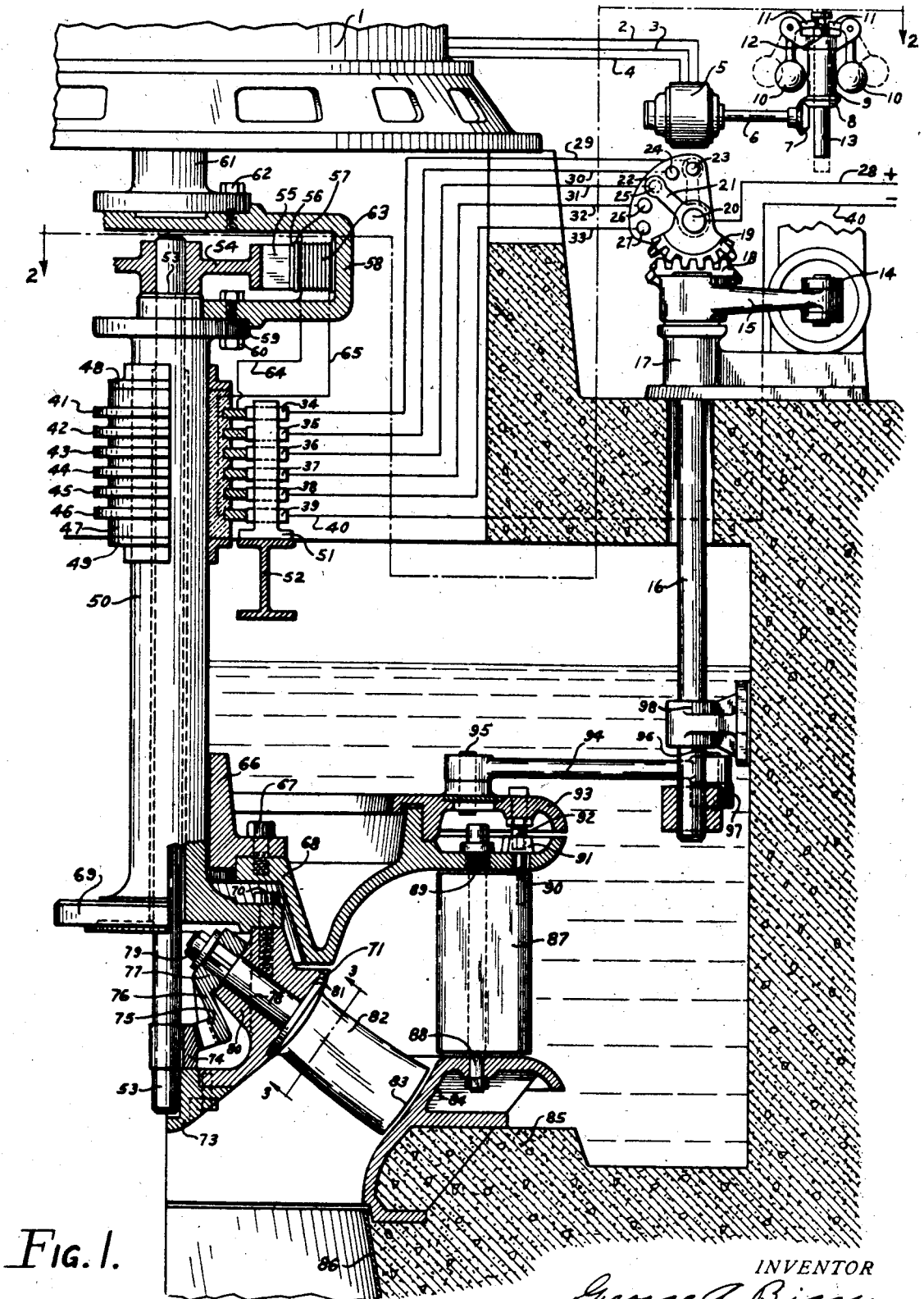
Figure 1 is a vertical cross section of the right hand half of a turbine with the generator and governor controls in full lines.

Referring to the drawings in detail, 1 designates a generator to which is connected by the wires 2, 3 and 4 into the generator circuit a governor motor 5. This governor motor operates through its armature shaft 6 a bevel gear 7 and a governor bevel gear 8. The bevel gear 8 is carried on the governor sleeve 9 which serves to rotate the weighted arms 10. These arms are connected by the fingers 11 working in the groove 12 to the governor shaft 13. This shaft operates in the usual manner the governor arm 14 which in turn rotates the arm 15 on the master control shaft 16. This shaft is journaled in the bracket 17.

The upper end of this shaft is provided with a gear 18 that meshes with the segmental rack 19. This rack is pivoted at 20 and carries a contact arm 21. The end 22 of this contact arm is adapted to engage with any one of a series of contacts 23, 24, 25, 26 and 27. The contact arm itself is connected to a source of current 28. Each of the contacts 23, 24, 25, 26 and 27 are respectively connected to wires 29, 30, 31, 32 and 33. These wires are on the positive side of the circuit and are in turn connected to stationary contact members 34, 35, 36, 37 and 38. The negative side of the circuit is connected to the contact 39.

The negative wire is designated 40. These contact members 34, 35, 36, 37, 38 and 39 respectively engage the slip rings 41, 42, 43, 44, 45 and 46 which are mounted on the sleeve of insulating material 47 which is carried between the shoulder rings 48 and 49 on the exterior of the runner shaft 50.

The contact members 34 to 39 inclusive are supported on the vertical support 51 which, in turn, is mounted on the angle iron 52 that traverses the space beneath the generator. The rotatable runner bucket adjusting shaft 53 is mounted within the runner shaft 50. It is provided at its upper end with a spider 54 on which is mounted a plurality of armature pieces 55 having arcuate outer faces 56 closely adjacent to the faces of the poles 57. These poles are mounted within the housing 58 which has a drum-shaped member, the bottom of which is connected to the flange 59 on the runner shaft by the bolts 60 and the top of which is connected to the generator shaft 61 by the bolts 62. This casing forms a connector between the runner shaft and the generator shaft. The pole pieces are provided with the usual coils 63, one end of which is connected on the positive side by the wire 64 to the contact member 34 and the other end of which on the negative side is connected by the wire 65 to the slip ring 46.

It will be noted that the segmental armature pieces and the poles are so arranged that only one segmental armature piece can register with any one pole at any one time. Thus, the successive energizing of each pole piece will serve to move the armature segment closest to that pole piece in the registration therewith, thereby resulting in a partial rotation of the bucket adjusting shaft 53. This results in adjusting the angularity of the runner buckets as will be hereinafter described.

The lower end of the runner shaft is journaled in the sleeve 66 which is bolted by the bolts 67 to the inner margin of the upper gate ring or cover designated 68.

Beneath this cover and sleeve is an expanded runner shaft hub 69 to which is bolted by the bolts 70 a hub ring 73 which receives the lower end of the bucket adjusting shaft 53 and which serves also to support the master adjusting gear 74 carried on the lower end of this shaft. This gear in turn meshes with a plurality of depending segmental racks 75 carried on the depending arms 76 which are attached by the sleeves 77 to the bucket shafts 78 and are held thereon by the sleeves 77 to the bucket shafts 78 and are held thereon by the clamping nuts 79.

These bucket shafts are journaled in the bearing sleeves 80 of the hub ring 71.

The shaft 78 is provided with an enlarged bearing hub 81 at the inner edge of the runner bucket 82. This bucket has an outer curved periphery edge 83 which is in equidistant spaced relationship with respect to the lower gate ring 84 that is mounted upon the concrete foundation 85. 86 represents the draft tube. The gates 87 are pivoted at 88 and 89 on the upper and lower gate rings.

These gates are adjusted by the depending pins 90 which are connected through the arms 91 to the depending pins 92 carried on the revolving ring 93 that is slidably and rotatably mounted upon the upper gate ring. This gate adjusting ring is provided with a pitman 94 attached to its margin at 95. The other end of the pitman is connected at 96 to the crank arm 97 that in turn is mounted upon the gate adjusting shaft 16 which is journaled in the bracket 98 carried on the foundation wall 85.

Figure 9:
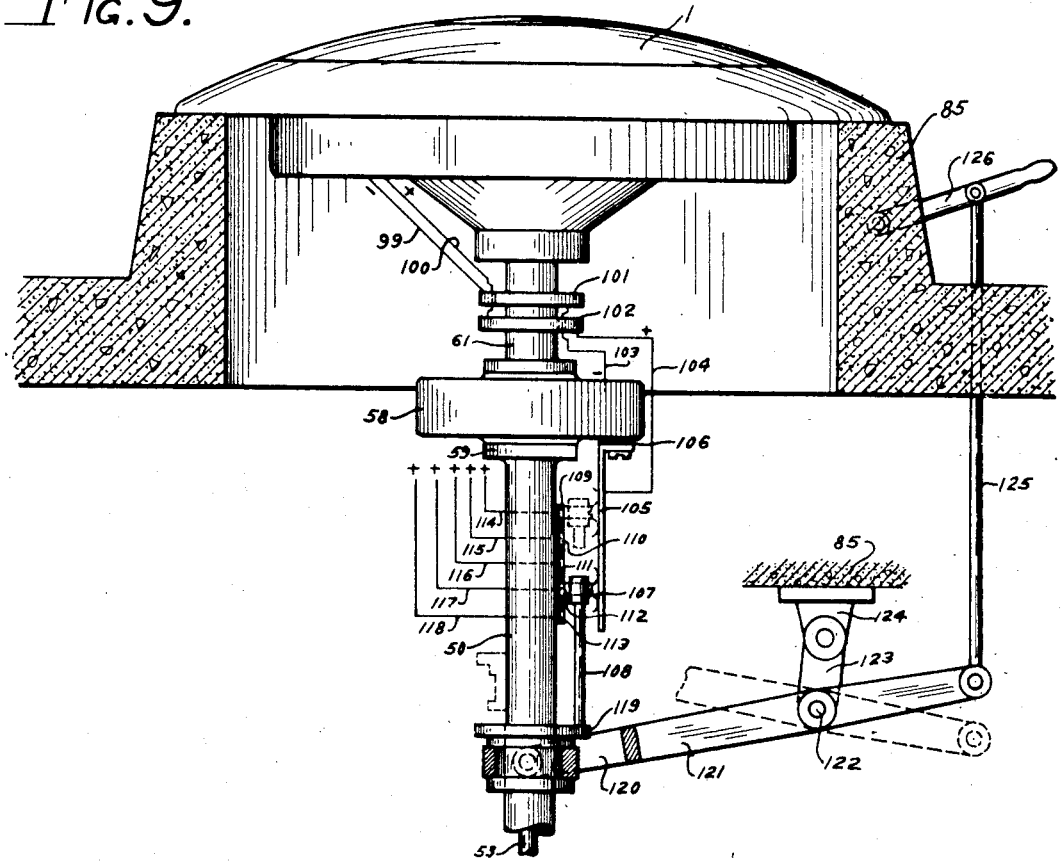
Figure 9 is a side elevation of a modified arrangement for transmitting the electric current from a stationary contact member to the rotary element of the adjusting mechanism.
Figure 10:
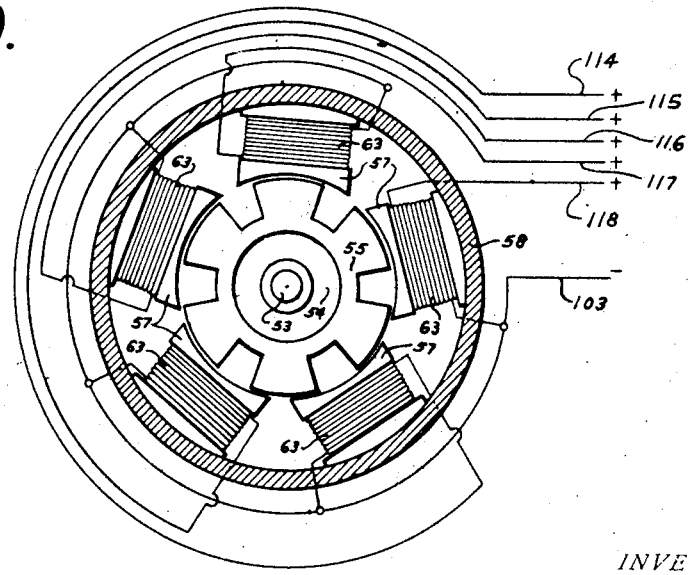
Figure 10 is a diagrammatic view of the electrical actuating mechanism for adjusting the buckets shown in Figure 9.

Turning to the modification in Figure 9 of the electrical control mechanism, which may be hand operated, it will be observed that I provide 2 lead wires 99 and 100 from the generator 1 which connect to distributor rings 101 and 102. A wire 103 leads from the ring 101 and a wire 104 leads from the ring 102. This wire 104 is connected to a depending stationary contact member 105 carried on the bottom of the connecting casing 58 and insulated therefrom by the insulation 106. This contact member 105 being in the shape of a long finger or strip is adapted to be engaged by the sliding contact 107 which is carried on the reciprocating arm 108. The other side of this contact member 107 is adapted to successively engage the contacts 109, 110, 111, 112 or 113. Such contacts are respectively connected to the wires 114, 115, 116, 117 and 118.

The arm 108 is reciprocated by the sleeve 119 on which it is mounted. This sleeve is engaged by the yoke 120 carried on the lever 121 which is pivoted at 122 to the link 123 that is in turn carried on the bracket 124 which is attached to the foundation 85. The free end of this lever 121 is pivotally connected to a pitman 125 that is operated by the lever 126.

*Operation*

The motor 5 which is directly connected into the generator circuit of the generator 1 by the wires 2, 3 and 4 operates at a speed proportional to the generator speed. As the speed of the generator increases and the arms move outwardly the shaft 13 is depressed which operates the governor arm 14 in the usual manner. The particular type of governor is not important and I have illustrated a standard type of governor without going into the details of its interior mechanism as such details form no part of the present invention.

As the arm 14 moves it operates the lever 15 and the gear 18. This in turn determines the position of the contact arm 21 and its contact end 22 with respect to any one of the contacts 23, 24, 25, 26 or 27.

This in turn will determine which one of the collector rings 41 to 45 will be energized.

It will be understood that each coil 63 is connected by wires 65 and 64 to its own independent collector ring and contact member so that only one coil is energized at a time.

The energization of any one solenoid will serve to draw the armature member 55 adjacent to it into alignment with it, as shown in Figures 4 to 8 thereby rotating the shaft 53 and positioning the buckets 82.

Simultaneously, the gates 87 are positioned as they are controlled by the movement of the arm 15, the shaft 16, the pin 96, lever 97, pitman 94, pin 95, ring 93, pin 92, lever 91 and pin 90.

Assuming that the turbine is standing idle ready to start operating, the turbine gates are closed. The fluid level is as indicated in Figure 1. To start operating the gate shaft 16 is rotated slightly in the customary manner for starting the turbine. This causes the gates 87 to open slightly from zero position and the fluid flows between the gates by gravity. It is directed against the adjustable vanes or buckets of the runner 82 which are now adjusted to zero position corresponding to the closed position of the gates 87.

The fluid flowing against the buckets 82 causes the runner shaft 50 and the collector rings 41 to 46 inclusive and the housing 58 together with the generator shaft 61 to rotate on their axis. The fluid then passes from the runner into the draft tube 86 and thence into the tail race which is not shown. As soon as the generator 1 begins to generate electrical current a portion of it is conducted by the wires 2, 3 and 4 to the motor 5 which results in setting the governor weighted arms into rotation. As the speed of the motor 5 is synchronized with the speed of the generator, the position of the weighted arms 10 will be properly proportioned. As they move outwardly these arms will move the governor shaft 13. The further they move out the wider the opening of the gates 87.

As the speed increases the buckets 82 are rotated, presenting their faces at greater angularity to the line of flow of the fluid as the speed increases thereby serving to maintain the generator at a constant speed for any given gate opening.

The problem is to maintain constant generator speed with a variable water supply and/or head. This is accomplished by adjustment of the gates and bucket positions so that the quantity of fluid passing through the runner even though it may vary due to variation in supply and/or head will be most effectively used and produce constant generator speed and maximum efficiency.

I have shown and described the use of direct current for causing the rotation of the shaft 53 but I do not wish to limit my invention to direct current as it is apparent that with suitable modifications alternate current of any suitable phase may be used without departing from the objects of my invention.

It is further understood that other details in arrangement and construction are comprehended within the scope of my claims and my invention.

My invention is particularly adaptable to existing generators where it is desired to remove the present fixed vane type of runner and install a variable position bucket runner without modifying the generator. No changes in the governor are necessary nor is any extra energy capacity required.

It will be understood that I desire to comprehend within my invention such modifications as may be necessary to adapt it to varying conditions and uses.

Having thus fully described my invention, what I claim as new and desire to secure by Letters Patent, is:

1. In a hydraulic turbine, a shaft, a drum-shaped housing suspended from said shaft, a runner and runner shaft suspended from the bottom of said housing, adjustable buckets on said runner, an interiorly disposed shaft in the runner projecting into said drum-shaped housing, gearing in the runner between said shaft and the buckets for adjusting the position of the buckets and electrical means selectively energized for rotating said bucket adjusting shaft, said means being carried in said drum housing, and comprising a plurality of spaced solenoids in said housing, a plurality of magnetized members adjacent thereto carried by said bucket adjusting shaft only one of said members in alignment with any solenoid at any time, means of conveying current selectively to any one of said solenoids, and means for determining said selection according to the speed of the driven shaft.

2. In a hydraulic turbine, a runner comprising a hollow runner shaft and a hub, a plurality of adjustable buckets mounted on said hub, a bucket adjusting shaft adapted to adjust said buckets, a plurality of spaced energized members carried by said bucket adjusting shaft, a plurality of solenoids adjacent to the respective energized members, current distributor rings mounted in said runner shaft, a plurality of contact members therefor, each of said solenoids being connected to a ring and a contact member for completing a circuit, a contact ring and a contact member connected to each of said solenoids and to the other side of said circuit and a selector mechanism for selecting the circuit and solenoid to be energized, and electrically controlled means for operating said selector mechanism according to the speed of the shaft driven by the runner.

3. In a hydraulic turbine, a runner shaft having a plurality of movable buckets, a bucket adjusting shaft rotatably mounted in the runner to operate the buckets, a ring on the end of said bucket shaft having spaced projecting segments, solenoids closely adjacent to the ends of said segments so arranged that only one solenoid is in line with one segment at a time, and means to selectively energize said solenoids one at a time for rotating the bucket adjusting shaft.

4. In a hydraulic turbine having a driven shaft, a housing suspended therefrom, a runner shaft suspended from said housing, a plurality of adjusting buckets on said runner shaft, a bucket adjusting shaft mounted in the runner shaft geared to said buckets, laterally extending members on said bucket adjusting shaft in the housing, a plurality of spaced solenoids in said housing only one of which is in alignment at any time with any one segment, a plurality of slip rings on said runner shaft, each one of which is connected to a particular solenoid on one side of the circuit, another slip ring to which all of the solenoids are connected on the other side of the circuit, a plurality of contact members engaging said slip rings, one of said contact members being connected to one side of the circuit and the remainder of the contact members to the other side of the circuit, and means depending upon the amount of current in the generator circuit for selectively energizing said solenoids or any of their circuits whereby the runner adjusting shaft is rotated and the buckets positioned without stopping the operation of the generator and the runner.

5. In a hydraulic turbine, a runner, adjustable bucket mechanism comprising a runner shaft, adjustable buckets geared thereto, a plurality of laterally disposed spaced segments on the bucket adjusting shaft annularly disposed, a plurality of solenoids annularly disposed closely adjacent to said segments of lesser number than said segments so arranged that only one segment can be in line with one solenoid at a time, and means for energizing selectively one of said solenoids at a time whereby the bucket adjusting shaft is rotated.

6. In a hydraulic turbine, a runner, adjustable buckets, geared mechanical means for adjusting the buckets, electrical means for operating the mechanical adjusting means, centrifugally operated means for selectively operating the electrical means, electrical means for driving the centrifugally operated means, and means for controlling the speed of the last mentioned electrical means according to the speed of the turbine, gates, and means for mechanically adjusting said gates by the centrifugally operated means.

7. In a hydraulic turbine having adjustable buckets and gates, electrically-operated means for regulating the position of the buckets, mechanically-operated means for regulating the position of the gates, and a singular governor-controlled means responsive to the turbine speed controlling the operation of the electrically-operated means, and also controlling the operation of the mechanically-operated means, said last named means comprising a shaft having a gate-controlling crank at one end and a contact-making arm at the other end.

8. In a hydraulic turbine having adjustable buckets and gates, electrically-operated means for regulating the position of the buckets, mechanically-operated means for regulating the position of the gates, and a singular governor-controlled means responsive to the turbine speed controlling the operation of the electrically-operated means, and also controlling the operation of the mechanically-operated means, said last named means comprising a shaft having thereon a gate-controlling crank, and means for directing the electric current to the electrically-operated means.

9. In a hydraulic turbine having adjustable buckets and gates, electrically-operated means for regulating the position of the buckets, mechanically-operated means for regulating the position of the gates, and a singular governor-controlled means responsive to the turbine speed controlling the operation of the electrically-operated means, and also controlling the operation of the mechanically-operated means, said last named means comprising a shaft having thereon a gate-controlling crank, and a contact arm operated by the shaft.

10. In a hydraulic turbine, a runner having adjustable buckets thereon, adjustable gates, a governor responsive to the speed of the runner shaft for adjusting the gates, electrically-operated means for adjusting the buckets, a plurality of independent circuits for supplying current to the electrically-operated means, and means operatively-connected to the gates for selectively making electric connection with said circuits.

11. In a hydraulic turbine, a foundation forming a water passageway, a draft tube therein, a runner suspended above the draft tube, a gate housing for said runner, gates in said housing, adjustable buckets on said runner, angularly disposed with respect to the axis of the runner and the gates and between the gates and the draft tube, electrically-operated means carried by said runner for positioning the buckets, mechanically-operated means for positioning the gates, and means for synchronously adjusting the gates and the buckets, responsive to the speed of the runner.

In testimony whereof, I affix my signature.

GEORGE A. BIGGS.